United States Patent
Zeng et al.

(10) Patent No.: US 8,818,702 B2
(45) Date of Patent: Aug. 26, 2014

(54) SYSTEM AND METHOD FOR TRACKING OBJECTS

(75) Inventors: Shuqing Zeng, Sterling Heights, MI (US); Yuanhong Li, La Mirada, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 937 days.

(21) Appl. No.: 12/942,456

(22) Filed: Nov. 9, 2010

(65) Prior Publication Data

US 2012/0116662 A1    May 10, 2012

(51) Int. Cl.
*B60W 30/08* (2012.01)
*G08G 1/16* (2006.01)
*G05D 1/00* (2006.01)
*G06F 17/10* (2006.01)

(52) U.S. Cl.
USPC .......................................... 701/301; 701/300

(58) Field of Classification Search
CPC .. G06K 9/00791; G06K 9/629; G01S 13/726; G01S 13/931; G01S 13/2013; G01S 13/9375; G01S 7/493; G06T 2207/30261; B60R 21/0134; B60R 2300/8093; B60T 2201/022; G05D 1/0289
USPC ................. 340/435–438, 903, 988; 382/103, 382/106–107, 154; 701/300–302
See application file for complete search history.

(56) References Cited

U.S. PATENT DOCUMENTS

| | | | |
|---|---|---|---|
| 6,085,151 A * | 7/2000 | Farmer et al. | 701/301 |
| 7,460,951 B2 * | 12/2008 | Altan et al. | 701/536 |
| 2008/0253606 A1 * | 10/2008 | Fujimaki et al. | 382/100 |
| 2008/0300787 A1 * | 12/2008 | Zeng | 701/301 |
| 2009/0167844 A1 * | 7/2009 | Seki et al. | 348/47 |
| 2009/0169052 A1 * | 7/2009 | Seki et al. | 382/103 |
| 2012/0093359 A1 * | 4/2012 | Kurien et al. | 382/103 |

OTHER PUBLICATIONS

Dubuisson, Séverine. "Recursive Clustering for Multiple Object Tracking." Image Processing, 2006 IEEE International Conference on. IEEE, 2006.*

Hermes, Christoph, et al. "Vehicle tracking and motion prediction in complex urban scenarios." Intelligent Vehicles Symposium (IV), 2010 IEEE. IEEE, 2010.*

Jia, Zhen, Arjuna Balasuriya, and Subhash Challa. "Vision based data fusion for autonomous vehicles target tracking using interacting multiple dynamic models." Computer vision and image understanding 109.1 (2008): 1-21.*

* cited by examiner

*Primary Examiner* — Khoi Tran
*Assistant Examiner* — Dale Moyer
(74) *Attorney, Agent, or Firm* — Parks IP Law LLC; Mickki D. Murray, Esq.

(57) ABSTRACT

A method for tracking an object, by generating kinematic models corresponding to the object using a computerized object-tracking system, is disclosed. The method includes receiving, by a data collection module, scan data associated with an object, and generating by the module, using the scan data, a new frame F, associated with a new time t+dt and including new points X. A clustering module identifies a new group G of new points $X_i$ of the new frame F. A data association module associates the new group G with the object based on previous information associated with the object. A tracking module determines a new kinematic model M corresponding to the object based on the new group G.

20 Claims, 6 Drawing Sheets

SYSTEM AND METHOD FOR TRACKING OBJECTS

TECHNICAL FIELD

The technical field is generally systems and methods for tracking objects.

BACKGROUND

Many modern automobiles have vehicle detection systems facilitating semi-autonomous and autonomous driving features such as collision avoidance. The vehicle detection systems use various methods of processing data from a scanner of the vehicle to detect the presence and determine the dynamics of other vehicles. These methods include Hough match methods and parametric L-shape methods.

However, Hough match methods and parametric L-shape methods have limitations. Hough match methods are computationally expensive and generate profiles that have discrete resolution and fixed size. Such profiles do not accurately describe the size or shape of many objects. Parametric L-shape methods are unstable and generally only useful for objects with rectangular profiles. For curved profiles, an L-shape can be fit to the curve in different ways, making it difficult to determine the orientation of the object.

SUMMARY

The present disclosure relates to methods and computerized object-tracking systems for tracking objects by generating kinematic models corresponding to the objects. In an exemplary embodiment, the computerized object-tracking system includes a data collection module, a clustering module, a data association module, and a tracking module.

The data collection module of the object-tracking system receives scan data associated with an object and generating, using the scan data, a new frame F, associated with a new time t+dt and including new points X.

The clustering module of the object-tracking system identifies a new group G of new points $X_i$ of the new frame F, where i=1, ... N, with N being a positive integer corresponding to a number of the new points.

The data association module of the object-tracking system associates the new group G with the object based on previous information associated with the object.

The tracking module of the object-tracking system determines a new kinematic model M corresponding to the object based on the new group G.

In some embodiments, the computerized object-tracking system includes a preprocessing module configured to process the new frame F prior to the clustering module identifying the new group G of new points $X_i$ of the new frame F. In some embodiments, the preprocessing module processes the new frame F includes the preprocessing module filtering the new frame F to represent the new frame F by at least one of vehicle-reference coordinates and ground-reference coordinates.

The foregoing has broadly outlined some of the aspects and features of various embodiments, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

General Overview

The embodiments of the present disclosure provide systems and methods for accurately, stably, and rapidly tracking objects (e.g., other vehicles) having various sizes and shapes. Accuracy, stability, and speed of tracking are improved at least in part by computing kinetic parameters of objects directly from scanning points (e.g., pixels) obtained by sensors, such as a rangefinder. With this direct, pixel-level analysis, performance is not hindered by the limitations (or, discrete effect) in pre-calculating profiles of discrete resolution or attempting to accurately match an object to such discrete-resolution profiles.

On the contrary, conventional Hough match methods compute kinetic parameters by matching an object to one or more pre-generated discrete profiles, and conventional parametric L-shape methods calculate kinetic parameters based on often inaccurate parametric L-shaped models. These conventional methods greatly rely on the fleeting accuracy with which abstract profiles describe the actual object.

In these and other ways provided herein, the systems and methods enhance and improve object detection and tracking. The systems and methods detect object size, shape, and orientation such that objects can be categorized, for example, as a vehicle, truck, motorcycle, or pedestrian.

Figure 1:
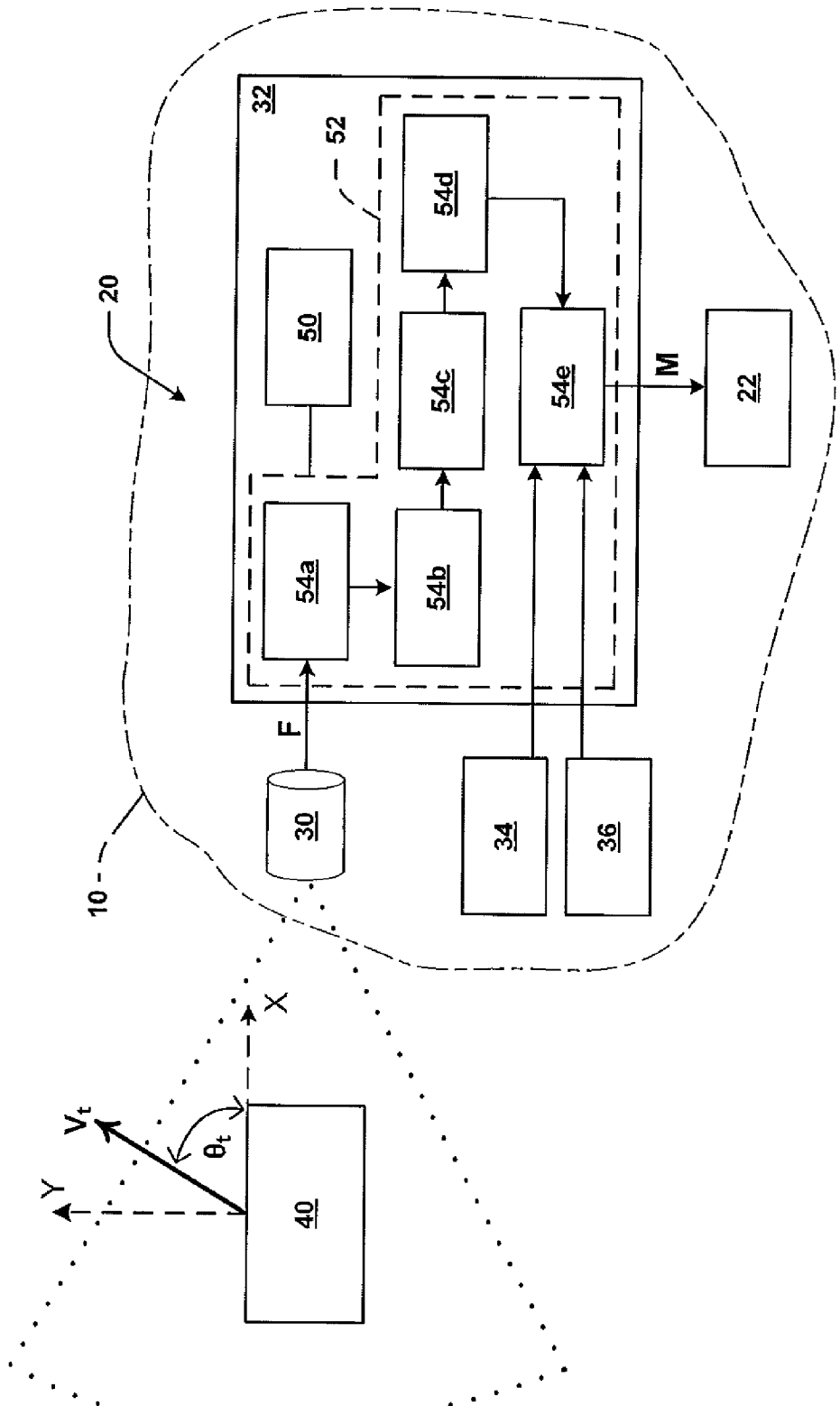
FIG. 1 is a schematic illustration of a vehicle that includes an object tracking system, according to an exemplary embodiment.

System: FIG. 1

Referring to the figures and more particularly to the first figure, FIG. 1 schematically illustrates components of an exemplary vehicle 10. The vehicle 10 includes an object tracking system 20 and auxiliary vehicle systems 22, such as Freeway Limited Ability Autonomous Driving (FLAAD) systems, Enhanced Collision Avoidance (ECA) systems, Constant Steering Angle and Velocity (CSAV) systems, and the like.

The object tracking system 20 is configured to generate data associated with tracked objects and the auxiliary vehicle systems 22 are configured to use the tracked object data to control the vehicle 10 and/or provide useful information to an operator of the vehicle 10. The tracked object data may include, for example, identification (e.g., a list) of at least one object 40 and generated kinematic models M corresponding to the objects. A kinematic model M can include position, velocity, acceleration, direction of velocity, direction of acceleration, and other motion parameters, as described in further detail below.

In one embodiment, the object tracking system 20 includes a rangefinder 30, a computing unit 32, a speed sensor 34, and a yaw rate sensor 36. These components are identified here and described below by way of example, as the object tracking system 20 may include these and/or other components in various combinations. For example, it is contemplated that the system 20 may include any of various types of accelerometers and object sensors such as a camera.

The rangefinder 30, speed sensor 34, and yaw rate sensor 36 are configured to measure data that is supplied as input to the computing unit 32. The rangefinder 30 is configured to measure scan data (which may be classified in frames F, as further described below), the speed sensor 34 is configured to measure the speed of the vehicle 10, and the yaw rate sensor 36 is configured to measure the yaw rate of the vehicle 10. Scan data includes distances D (referenced in FIG. 3) from the rangefinder 30 to points on objects measured at angular positions A (also referenced in FIG. 3). For purposes of teaching, the rangefinder 30 is illustrated as performing a scan of an object 40 in FIGS. 1 and 3. Objects 40 tracked by the present vehicle 10 can be vehicles, pedestrians, motorcycles, and others.

The rangefinders 30 can include an ultrasonic ranging module, an optical ranging sensor, a light detection and ranging (LiDAR) sensor, a rangefinder cameras, a stadimeter, a laser rangefinder, a macrometer, scanners, combinations thereof, and the like. For purposes of teaching, a LiDAR sensor is described in further detail. LiDAR sensors measure range using a time of flight principle. A light pulse is emitted for a defined length of time, reflected off of a target object, and received via the same path (line-of-sight) along which it was sent. Because light travels with constant velocity, the time interval between emission and detection is proportional to a distance between the sensor to the point of reflection.

The computing unit 32 includes a processor 50, a tangible, non-transitory, computer-readable medium (represented by a memory 52), and program modules 54 that are stored in the memory 52. In one embodiment, the program modules 54 include a data collection module 54a, a preprocessing module 54b, a clustering module 54c, a data association module 54d, and a tracking module 54e.

Figure 2:
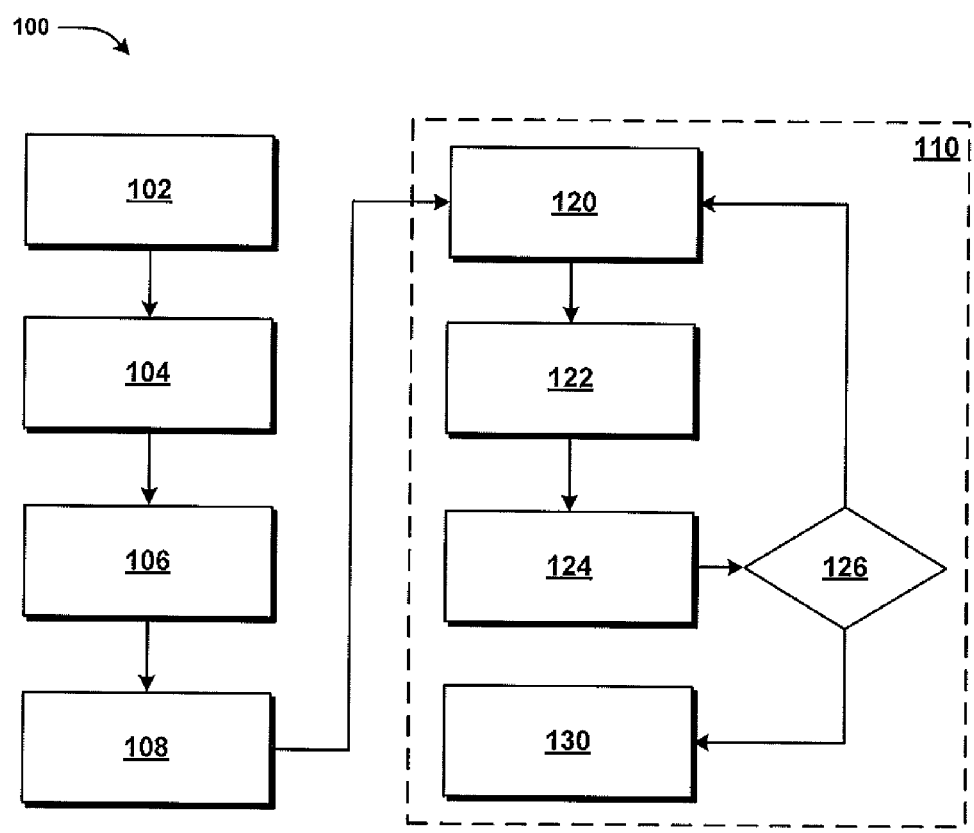
FIG. 2 is a block diagram of steps of a method performed by the object tracking system of FIG. 1.

The program modules 54 include computer-executable instructions that, when executed by the processor 50, cause the processor 50 to perform a method 100, illustrated in FIG. 2, for determining tracked object data. In the method 100 of FIG. 2, generally, the data collection module 54a includes computer-executable instructions for performing a data collection step 102; the preprocessing module 54b includes computer-executable instructions for performing a preprocessing step 104; the clustering module 54c includes computer-executable instructions for performing a clustering step 106; the data association module 54d includes computer-executable instructions for performing a data association step 108; and the tracking module 54e includes computer-executable instructions for performing a tracking step 110.

Method: FIGS. 2-6

The steps of the method 100 are now described in further detail. In general, the method 100 generates tracked object data including a list of tracked objects 40 and associated kinematic models M. The exemplary method 100 incorporates a localized point-matching scheme and a likelihood-maximization scheme as described in further detail below with respect to a tracking step 110 of the method 100.

The method 100 generates tracked object data from scan data that is measured at different times or time periods by the rangefinder 30. Scan data that is associated with a certain time is referred to herein as a frame F. Generally, frames F are periodically generated and saved, and the method 100 is performed for each new frame F to generate a corresponding new kinematic model M.

Figure 3:
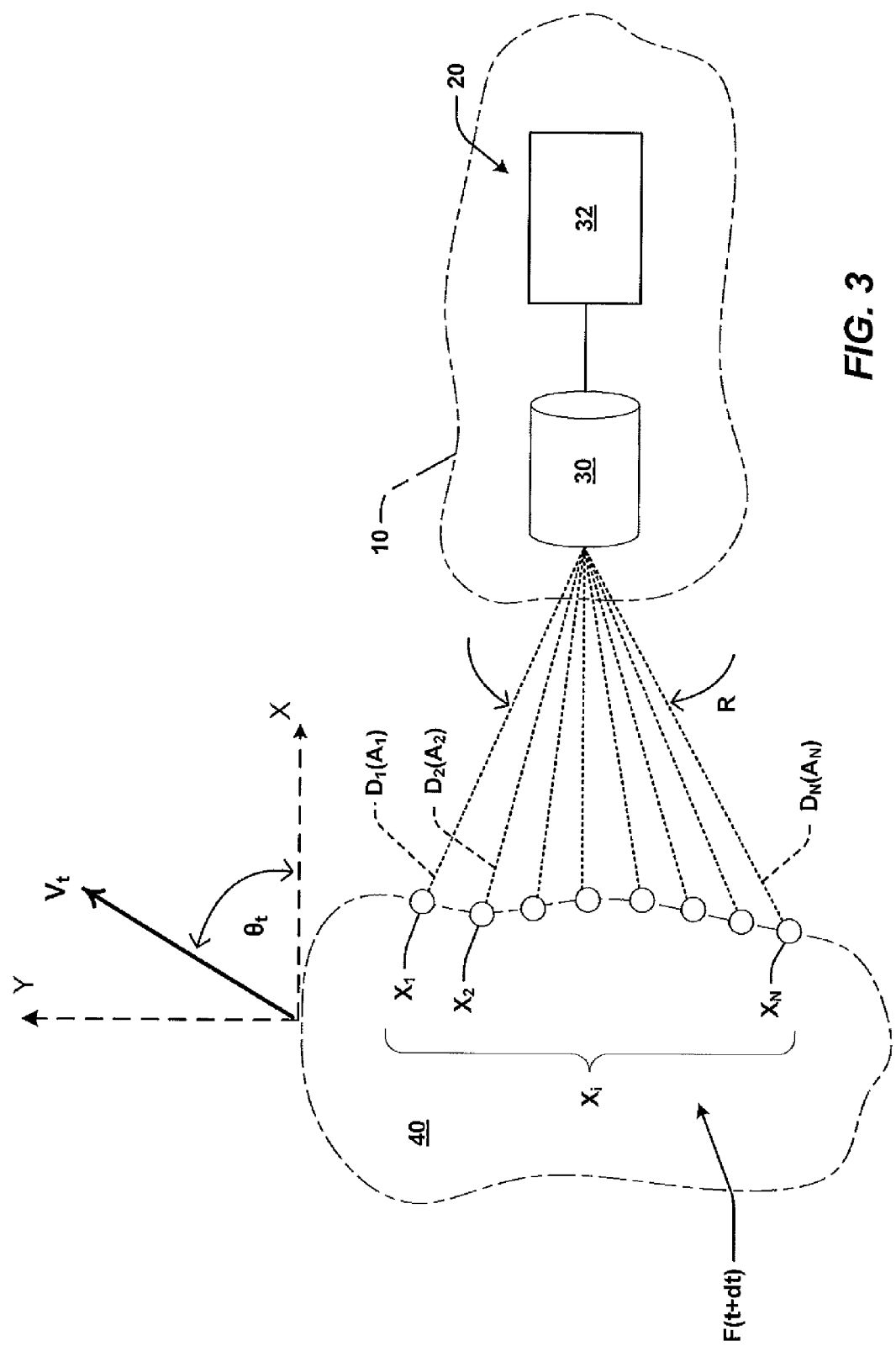
FIGS. 3-6 are schematic views illustrating steps of the method of FIG. 2.
Figure 4:
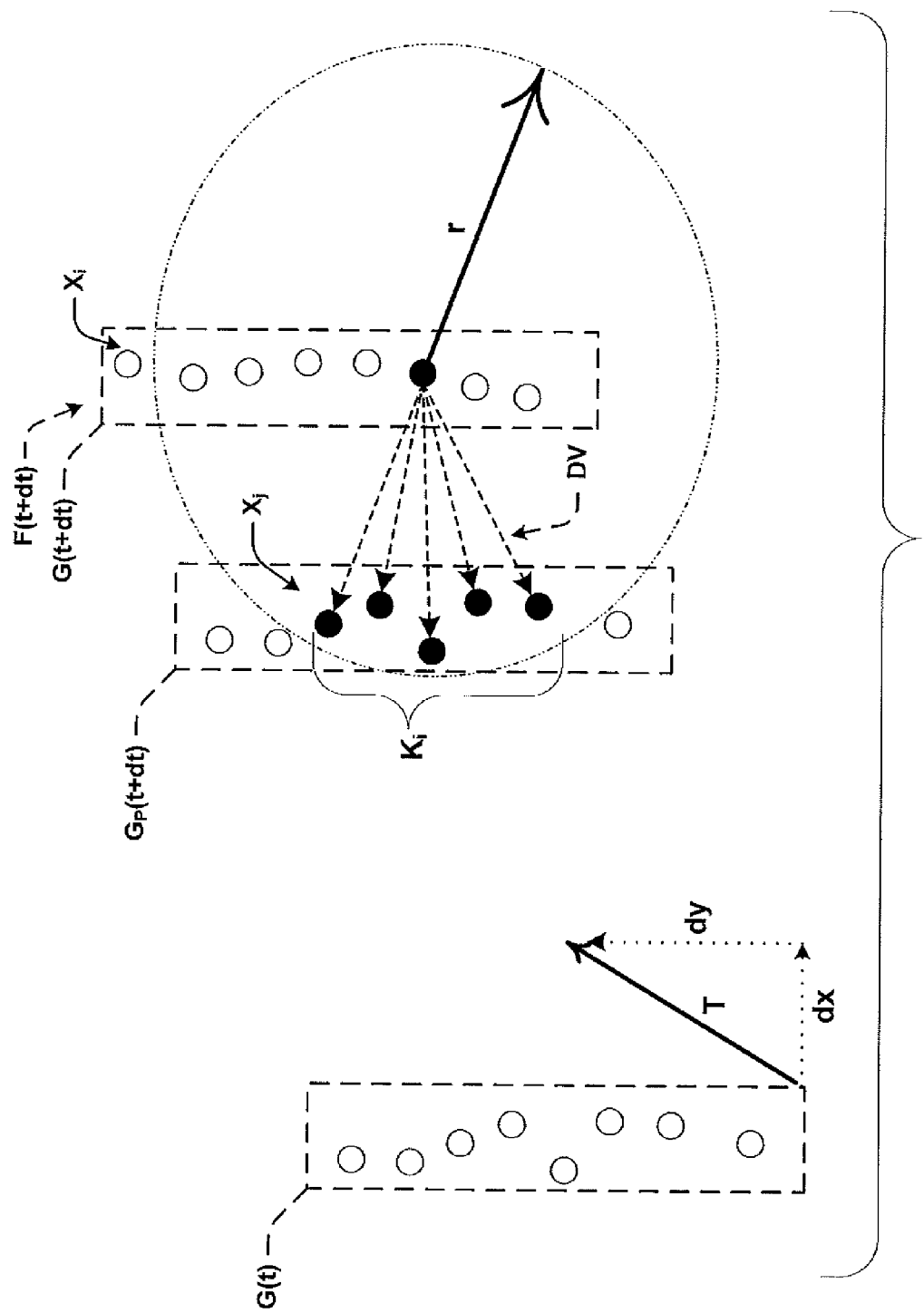
Figure 6:
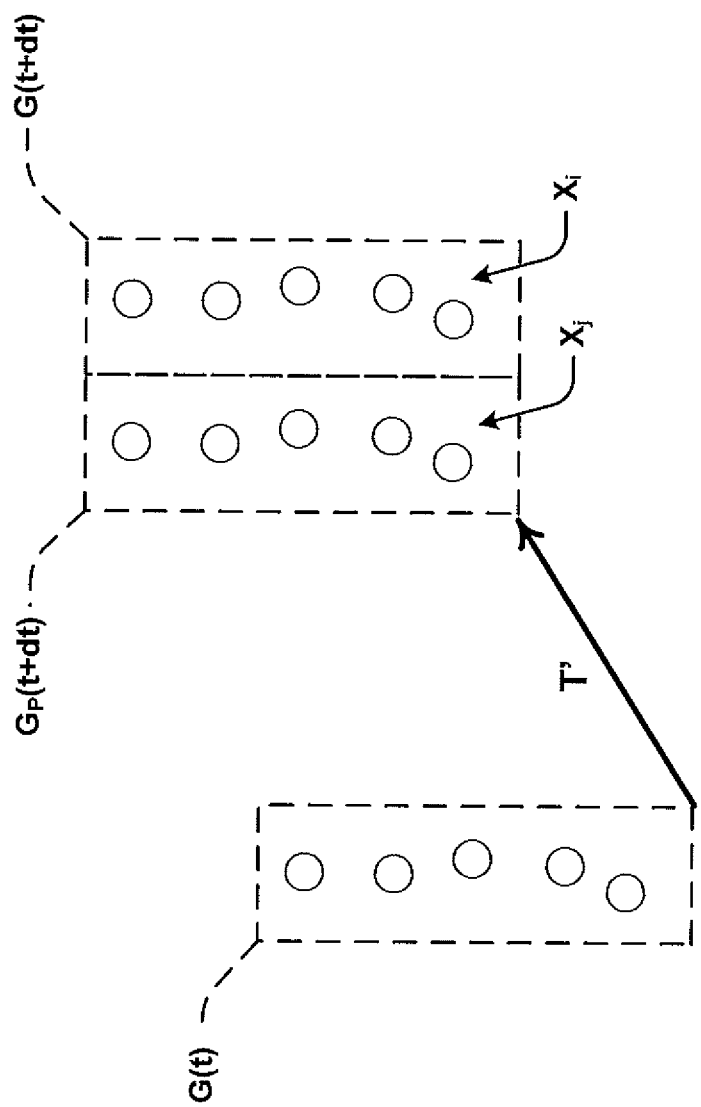

Frames F that are measured at distinct times (e.g., consecutive times) are separated by a time difference, referred to herein by dt (e.g., FIGS. 3, 4, and 6). In FIG. 4, for instance, a previous frame F is measured at a previous time t, and a new frame F is measured at a new time t+dt. For purposes of distinguishing elements associated with the new time t+dt from elements associated with the previous time t in the present description, the terms "new" and "previous" are used. In the drawings, the times t, t+dt are used in connection with various depicted elements.

Referring to FIGS. 2-6, the steps of the method 100 are described with respect to a certain tracked object 40. In general, for the tracked object 40, a new kinematic model M that is associated with the tracked object 40 is generated as a function of each new frame F. The method 100 is configured to simultaneously track objects and initialize and remove associated frames F.

According to the data collection step 102, in connection with a new time t+dt, the data collection module 54a instructs the rangefinder 30 to sweep through an angle range R (e.g., 90 degrees, 180 degrees, 360 degrees, etc.), such as in a two-dimensional measurement plane, to measure the area in the range for generating a new frame F. In one contemplated embodiment, the rangefinder 30 performs this sweep task automatically, or otherwise without direct instruction from the data collection module 54a.

The new frame F includes distances $D_1, D_2, \ldots D_Z$ at each angle $A_1, A_2, \ldots A_Z$ in the angle range R, as illustrated in FIG. 3, for example, where Z is a total number of data points in the frame F. The distances D are between the rangefinder 30 and new points $X_1, X_2, \ldots X_N$ on the object 40.

In some embodiments, the angles A in the angle range R are separated according to an angular resolution, such as 0.25 degrees between angles, and the distances D are measured at a selected distance resolution, such as one millimeter. The data collection module 54a records the new frame F in the memory 52, where one or more previous frames F are also stored.

According to the preprocessing step 104, the preprocessing module 54b processes the new frame F as needed, which may include filtering the frame F. The processing module 54b may be configured to filter the new frame F to represent the new frame F by, for instance, vehicle-reference coordinates in the form of polar coordinates, Cartesian coordinates (e.g., with the vehicle as the origin), or ground-reference coordinates (e.g., with a fixed point on the ground as the origin).

In some embodiments, the processing module 54b filters the new frame F according to requirements of one or more applications of the vehicle 10 that will use the filtered frame data. For example, the processing module 54b is in some embodiments configured to represent the new frame F in a manner required by at least one vehicle application, such as by vehicle-reference coordinates in the form of polar coordinates, Cartesian coordinates, and/or ground-reference coordinates, as most appropriate for the particular application(s).

In various embodiments, the preprocessing step 104 includes noise reduction, point sampling, and/or the like.

According to the clustering step 106 of FIG. 2, with reference to FIG. 4, the clustering module 54c identifies new groups G of points X in the new frame F based on an affinity characteristic (e.g., measure) between certain of the new points X. For example, new points X that are within a certain distance of one another are clustered into a new group G. For purposes of teaching, the new group G illustrated in FIG. 4 includes new points $X_i$ (where i=1, . . . N). Multiple new groups G can be formed from the new frame F, and the new frame F can be segmented to isolate new groups G for purposes of processing.

The method 100 is also configured to initialize and remove objects during the data association step 108, as described further, below.

During an initialization sub-step of the data association step 108, if an object is not currently tracked and is observed for a plurality of frames, the object is stored in the tangible, non-transitory computer-readable medium of the object tracking system as a tracked object and the kinematic model of the object is generated according to the steps of the method 100. The data association module is configured in various embodiments to initialize a new object if the object is not currently tracked and the new object is observed for two consecutive frames, three consecutive frames, four consecutive frames, or etc.

During a removal sub-step of the data association step 108, if a tracked object has not been seen for multiple frames, it is removed. The data association module is configured in various embodiments to remove the tracked object from a tangible, non-transitory computer-readable medium if the object is not noticed in new frame data for two consecutive frames, three consecutive frames, four consecutive frames, or etc.

Further according to the data association step 108, the data association module 54d associates the new group G with the object 40 in the computer-readable medium. For example, the data association module 54d associates the new group G with the object 40 in response to determining a relationship between new kinematic characteristics (e.g., distance to or location of points X, angles corresponding to points, velocities, directions of motion) and previous kinematic characteristics (e.g., characteristics of a kinematic model M), a distance between the new group G and a previous group G, and a similarity in geometry and/or size between the new group G and the previous group G. The new group G is the current representation of the object 40 and is used according to the method 100 (e.g., step 110, described below) to determine the new kinematic model M of the object 40.

According to the tracking step 110, the tracking module 54e determines the new kinematic model M of the object 40 as a function of the new Group G and one or more previous groups G representing the object 40. The tracking module 54e, in some embodiments, determines the new kinematic model M of the object 40 as a function of the new Group G and at least one of (i) one or more previous groups G representing the object 40 and (ii) one or more previous kinematic models.

Referring to FIGS. 2 and 4, the tracking step 110 includes a predicting sub-step 120 in which a predicted group $G_p$ is generated. The predicted group $G_p$ is generated as a function of the previous kinematic model M, the previous group G, and a translation vector T. In one embodiment, the predicted group $G_p$ for a future time t+δt is given by:

$$G_{t+\delta t}^p = G_t + T_t|_{\delta t}.$$

The translation vector T includes x-direction and y-direction components dx, dy that are determined as a function of a velocity $V_t$ and a velocity direction θt of the previous kinematic model M. For example, the components dx, dy are in some embodiments related to the velocity $V_t$ and velocity direction θt as follows:

$$T_t|_{\delta t} = \begin{bmatrix} dx \\ dy \end{bmatrix} I_N = \begin{bmatrix} V_t\cos(\theta_t)dt \\ V_t\sin(\theta_t)dt \end{bmatrix} I_N,$$

where $I_N$ is an identity matrix (e.g., a 1×N unit vector, whose elements are all 1).

The translation vector T maps each point of the previous group G (represented by previous points X) to the predicted group $G_p$ such that the predicted group $G_p$ estimates the position of the new group G. During the tracking step 110, the predicted group $G_p$ is further iteratively matched to the new group G if necessary. Particularly, the translation vector T is iterated until the predicted group $G_p$ matches the new group G. Techniques such as localized point-matching and maximum-likelihood are used to determine a translation adjustment vector ΔT that is used to iteratively adjust the translation vector T. These techniques are described in further detail below in connection with steps 122 and 124 of the method 100 of FIG. 2 and with FIG. 4.

A localized point-matching sub-step 122 of the tracking step 110 includes determining a number $K_i$ of neighboring prediction points $X_j$ in the predicted group $G_p$ for each new point $X_i$ in the new group G. For example, a number $K_i$ of neighboring prediction points $X_j$ for each new point $X_i$ is within a selected distance, e.g., radial distance r, of each new point $X_i$. Referring to FIG. 4, neighboring prediction points $X_j$ (shaded) of the predicted group $G_p$ are shown to fall within a radial distance of one of the new points $X_i$ (shaded) of the new group G. Further, a distance vector DV extends between each new point $X_i$ and each of the neighboring prediction points $X_j$.

According to a maximum-likelihood sub-step 124 of the tracking step 110, the tracking module 54e determines the translation adjustment vector ΔT so as to maximize the likelihood that the predicted group $G_p$ matches the new group G. The translation adjustment vector ΔT is determined as each new point $X_i$ is matched to its neighboring prediction points $X_j$. For example, to match each new point $X_i$ to its neighboring prediction points $X_j$, the aggregate of distances between each new point $X_i$ and its neighboring prediction points $X_j$ is minimized.

Figure 5:
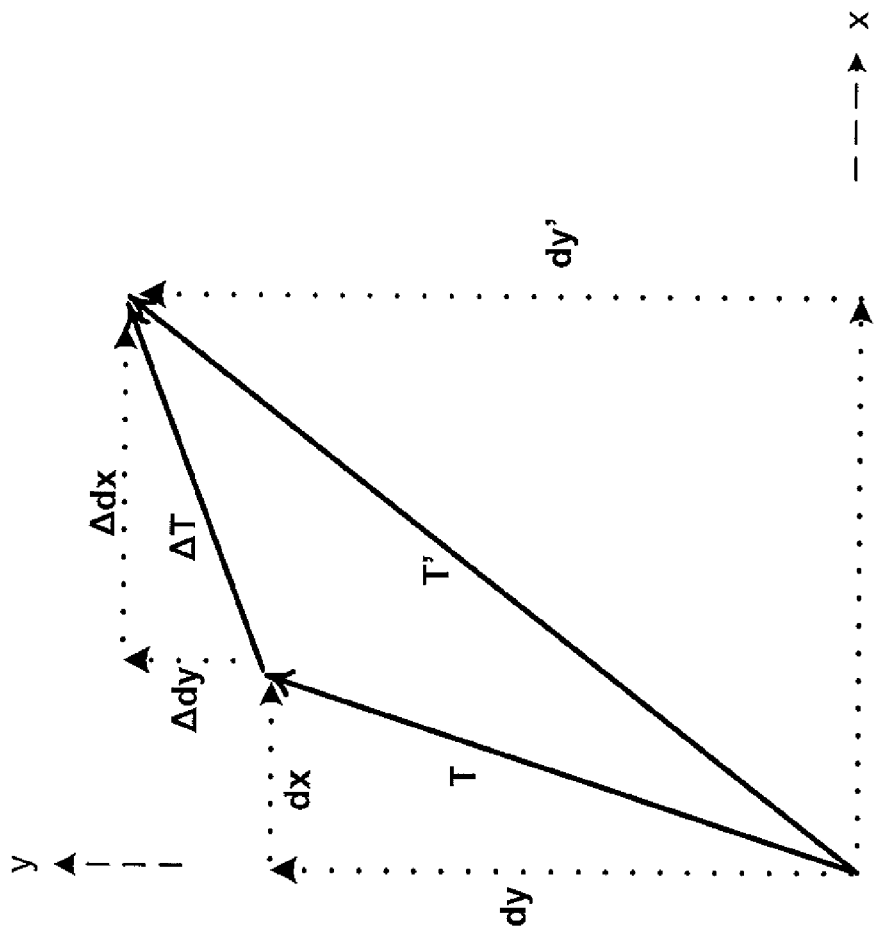

Referring to FIG. 5, the translation adjustment vector ΔT includes x-direction and y-direction components Δdx, Δdy and is added to the initial translation vector T to get an iterated translation vector T'. The translation adjustment vector ΔT represents the difference between the current translation vector T and the next iteration of the translation vector T'.

The likelihood of match between all of the new points $X_i$ and their $K_i$ neighboring prediction points Xj can be given by:

$$L = \prod_{i=1}^{N} \prod_{j=1}^{K_i} P(X_i - X_j),$$

where P(x) is a function that represents the distribution of the neighbor points $X_j$ to a point $X_i$. For example, P(x) is a Gaussian kernel function given by:

$$P(x) = e^{\left(-\frac{x^2}{2\sigma^2}\right)},$$

where sigma σ is the parzen window size.

For convenience, the logarithm of the likelihood function, log L or ln L, called the log-likelihood, is taken and the points $X_i$, $X_j$ (position vectors) are represented with their x-direction and y-direction components ($x_i$, $y_i$, $x_j$, $y_j$). Further, the likelihood function is modified to include components Δdx, Δdy of the translation adjustment vector ΔT. The logarithm of the modified likelihood function is given as:

$$\log L = \frac{1}{2\sigma^2} \sum_{i=1}^{N} \sum_{j=1}^{K_i} ((x_i - x_j - \Delta dx)^2 + (y_i - y_j - \Delta dy)^2) + const.$$

The modified log-likelihood function is used to determine values for the elements Δdx, Δdy of the translation adjustment vector ΔT that maximize the log-likelihood. To determine the translation adjustment vector elements Δdx, Δdy, the derivative of the log-likelihood with respect to both the x-direction and the y-direction is set to zero as follows:

$$\frac{\partial \log L}{\partial \Delta dx} = \frac{1}{2\sigma^2} \sum_{i=1}^{N} \sum_{j=1}^{K_i} -2(x_i - x_j) + 2\Delta dx = 0, \text{ and}$$

$$\frac{\partial \log L}{\partial \Delta dy} = \frac{1}{2\sigma^2} \sum_{i=1}^{N} \sum_{j=1}^{K_i} -2(y_i - y_j) + 2\Delta dy = 0$$

Solving for the translation vector elements Δdx, Δdy gives:

$$\Delta dx = \frac{1}{\sum_{i=1}^{N} K_i} \sum_{i=1}^{N} \sum_{j=1}^{K_i} (x_i - x_j), \text{ and}$$

$$\Delta dy = \frac{1}{\sum_{i=1}^{N} K_i} \sum_{i=1}^{N} \sum_{j=1}^{K_i} (y_i - y_j)$$

Once the components Δdx, Δdy of the translation adjustment vector ΔT are determined, referring to FIG. 5, the tracking module 54e determines the iterated translation vector T' by adding the initial translation vector T and the translation adjustment vector ΔT.

According to an iteration decision sub-step 126 in the method 100 of FIG. 2, the tracking module 54e determines whether the iterated translation vector T' has converged so as to match the predicted group $G_p$ to the new group G. For example, the tracking module 54e determines convergence as a function of the magnitude of the translation adjustment vector ΔT. If the magnitude of the translation adjustment vector ΔT is above a predetermined threshold, the iterated translation vector T' is treated as an initial translation vector and further iterated according to sub-steps 120, 122, 124, 126 of the tracking step 110. If the magnitude of the translation adjustment vector ΔT is within the predetermined threshold, the iterated translation vector T' is used to determine parameters of the new kinematic model M at a modeling sub-step 130.

Once the iterated translation vector T' has converged, the iterated translation vector T' matches the predicted group $G_p$ to the new group G. According to the modeling sub-step 130, when the new group G and the predicted group $G_p$ match sufficiently, the tracking module 54e determines the new kinematic model M as a function of components dx', dy' of the iterated translation vector T'. For example, the components dx', dy' of the iterated translation vector T' are used to determine velocity $V_t$ and angle of velocity θt for the new kinematic model M according to:

$$V_t = \frac{\sqrt{dx^2 + dy^2}}{\delta t} \text{ and } \theta_t = \arctan\left(\frac{dy}{dx}\right).$$

Further, in some embodiments, the new kinematic model M is combined with the vehicle speed and yaw rate provided by speed sensor 34 and yaw rate sensor 36 in the modeling sub-step 130 of the tracking step 110. This combination may be performed in all or select scenarios. Performing the combination or using the combined result could depend on an application of the vehicle 10 or requirement of the operator of the vehicle 10. For instance, if scanning points are based on vehicle-reference coordinates, this combining step may be performed to provide ground-referenced kinematic parameters for classification purpose. Exemplary classifications in this context involve categorizing the object according to its kinematic characteristics, such as classifying the object as moving or being still.

The tracking module 54e outputs the new kinematic model M to the auxiliary vehicle systems 22, as shown in FIG. 1.

The above-described embodiments are merely exemplary illustrative of implementations that are set forth for a clear understanding of principles. Variations, modifications, and combinations may be made to the above-described embodiments without departing from the scope of the claims. All such variations, modifications, and combinations are included herein by the scope of this disclosure and the following claims.

What is claimed is:

1. A non-transitory computer-readable storage device comprising instructions that, when executed by a processor, cause the processor to perform operations, for tracking from a vehicle, an object by generating kinematic models corresponding to the object, comprising:
receiving scan data associated with the object;
generating, using the scan data, a new frame F, associated with a new time t+dt and including new points X;
identifying a new group G of new points $X_i$, of the new points X of the new frame F, where i=1, . . . , N, with N being a positive integer corresponding to a number of the new points;
associating the new group G with the object based on previous information associated with the object; and
determining, based on the new group G, a new kinematic model M corresponding to the object;
wherein:
determining, based on the new group G, the new kinematic model M corresponding to the object includes generating a predicted group $G_p$;
determining the new kinematic model M includes iteratively matching the predicted group $G_p$ to the new group G;
iteratively matching the predicted group $G_p$ to the new group G includes determining an initial translation adjustment vector ΔT and iteratively adjusting a translation vector T using the initial translation adjustment vector ΔT; and determining the initial translation adjustment vector ΔT is performed using at least one of:
a localized point-matching technique; and
a maximum-likelihood technique.

2. The computer-readable storage device of claim 1, wherein:
the operations further comprise processing the new frame F prior to identifying the new group G of new points $X_i$; and
processing the new frame F includes filtering the new frame F to represent the new frame F by vehicle-reference coordinates.

3. The computer-readable storage device of claim 1, wherein:
the operations further comprise processing the new frame F prior to identifying the new group G of new points $X_i$; and
processing, the new frame F includes filtering the new frame F to represent the new frame F by ground-reference coordinates.

4. The computer-readable storage device of claim 1, wherein:
generating the predicted group $G_p$ is performed as a function of a previous kinematic model representing the object, the new group G, and a translation vector T;
the predicted group $G_p$ corresponds to a future time t+δt, and is determined according to:

$$G_{t+\delta t}{}^P = G_t + T_t|_{\delta t};$$

$G^P$ represents the predicted group $G_p$;
$G^P_{t+\delta t}$ represents the predicted group in association with the future time t+δt;
$T_t|_{\delta t}$ represents the translation vector T;
the translation vector $T_t|_{\delta t}$ includes an x-direction translation component dx and a y-direction translation component dy;
the translation components are determined as a function of a velocity $V_t$ and a velocity direction θt of the previous kinematic model representing the object;
the translation components dx, dy are related to the velocity $V_t$ and the velocity direction θt of the previous kinematic model representing the object according to:

$$T_t|_{\delta t} = \begin{bmatrix} dx \\ dy \end{bmatrix} I_N = \begin{bmatrix} V_t \cos(\theta_t) dt \\ V_t \sin(\theta_t) dt \end{bmatrix} I_N;$$

and
$I_N$ is an identity matrix.

5. The computer-readable storage device of claim 1, wherein the localized point-matching technique includes identifying neighboring prediction points $X_j$, the neighboring prediction points $X_j$ being points of the predicted group $G_p$ located within a specified distance of each of the new points $X_i$ of the new group G.

6. The computer-readable storage device of claim 1, wherein the maximum-likelihood technique includes determining the translation adjustment vector ΔT so as to maximize a likelihood that the predicted group $G_p$ matches the new group G, including matching each of the new points $X_i$ to a neighboring predicted point $X_j$ of the predicted group $G_p$, such that an aggregate of distances between each new point $X_i$ and neighboring prediction points $X_j$ is minimized.

7. The computer-readable storage device of claim 6, wherein the maximum-likelihood technique further includes adding the translation adjustment vector ΔT to the initial translation vector T to produce an iterated translation vector T'.

8. The method of claim 7, wherein the maximum-likelihood technique includes determining whether the iterated translation vector T' has converged so as to match the predicted group $G_p$ to the new group G.

9. The computer-readable storage device of claim 1, wherein:
if the magnitude of the translation adjustment vector ΔT is above a predetermined threshold, the iterated translation vector T' is further iterated; and
if the magnitude of the translation adjustment vector ΔT is within the predetermined threshold, the iterated translation vector T' is used to determine parameters of the new kinematic model M, including using components di', dy' of the iterated translation vector T' to determine a velocity $V_t$ and an angle of velocity θt for the new kinematic model M according to relationships represented as:

$$V_t = \frac{\sqrt{dx^2 + dy^2}}{\delta t} \text{ and } \theta_t = \arctan\left(\frac{dy}{dx}\right).$$

10. A non-transitory computer-readable storage device comprising instructions that, when executed by a processor, cause the processor to perform operations, for tracking from a vehicle, an object by generating kinematic models corresponding to the object, comprising:
receiving scan data associated with the object;
generating, using the scan data, a new frame F, associated with a new time t+dt and including new points X;
identifying a new group G of new points $X_i$, of the new points X of the new frame F, where i=1, . . . , N, with N being a positive integer corresponding to a number of the new points;
associating the new group G with the object based on previous information associated with the object; and
determining, based on the new group G, a new kinematic model M corresponding to the object;
wherein:
determining, based on the new group G, the new kinematic model M corresponding to the object includes generating a predicted group $G_p$;
determining the new kinematic model M includes iteratively matching the predicted group $G_p$ to the new group G;
iteratively matching the predicted group $G_p$ to the new group G includes determining an initial translation adjustment vector ΔT, and iteratively adjusting a translation vector T using the initial translation adjustment vector ΔT;
if the magnitude of the translation adjustment vector ΔT is above a predetermined threshold the iterated translation vector T' is further iterated; and
if the magnitude of the translation adjustment vector ΔT is within the predetermined threshold, the iterated translation vector T' is used to determine parameters of the new kinematic model M, including using components dx', dy' of the iterated translation vector T' to determine a velocity $V_t$ and an angle of velocity θt for the new kinematic model M according to relationships represented as:

$$V_t = \frac{\sqrt{dx^2 + dy^2}}{\delta t} \text{ and } \theta_t = \arctan\left(\frac{dy}{dx}\right).$$

11. The computer-readable storage device of claim 10, wherein:
the operations further comprise processing the new frame F prior to identifying the new group G of new points $X_i$ of the new frame F; and
processing the new frame F includes filtering the new frame F to represent the new frame F by vehicle-reference coordinates.

12. The computer-readable storage device of claim 10, wherein:
the operations further comprise processing the new frame F prior to identifying the new group G of new points $X_i$ of the new frame F; and
processing the new frame F includes filtering the new frame F to represent the new frame F by ground-reference coordinates.

13. The computer-readable storage device of claim 10, wherein:
generating the predicted group $G_p$ is performed as a function of a previous kinematic model representing the object, the new group G, and a translation vector T;
the predicted group $G_p$ corresponds to a future time t+δt, and is determined according to:

$$G_{t+\delta t}{}^P = G_t + T_t|_{\delta t};$$

$G^P$ represents the predicted group $G_p$;
$G^P{}_{t+\delta t}$ represents the predicted group in association with the future time t+δt;
$T_t|_{\delta t}$ represents the translation vector T;
the translation vector $T_t|_{\delta t}$ includes an x-direction translation component dx and a y-direction translation component dy;
the translation components are determined as a function of a velocity $V_t$ and a velocity direction θt of the previous kinematic model representing the object;
the translation components dx, dy are related to the velocity $V_t$ and the velocity direction θt of the previous kinematic model representing the object according to:

$$T_t|_{\delta t} = \begin{bmatrix} dx \\ dy \end{bmatrix} I_N = \begin{bmatrix} V_t\cos(\theta_t)dt \\ V_t\sin(\theta_t)dt \end{bmatrix} I_N;$$

and
where $I_N$ is an identity matrix.

14. The computer-readable storage device of claim 10, wherein:
determining the initial translation adjustment vector ΔT is performed using a localized point-matching technique; and
the localized point-matching technique includes identifying neighboring prediction points $X_j$, the neighboring prediction points $X_j$ being points of the predicted group $G_p$ located within a specified distance of each of the new points $X_i$ of the new group G.

15. The computer-readable storage device of claim 10, wherein:
determining the initial translation adjustment vector ΔT is performed using a maximum-likelihood technique; and
the maximum-likelihood technique includes determining the translation adjustment vector ΔT so as to maximize a likelihood that the predicted group $G_p$ matches the new group G, including matching each of the new points $X_i$ to a neighboring predicted point $X_j$ of the predicted group $G_p$, such that an aggregate of distances between each new point $X_i$ and neighboring prediction points $X_j$ is minimized.

16. The computer-readable storage device of claim 15, wherein the maximum-likelihood technique further includes adding the translation adjustment vector ΔT to the initial translation vector T to produce an iterated translation vector T'.

17. The method of claim 16, wherein the maximum-likelihood technique includes determining whether the iterated translation vector T' has converged so as to match the predicted group $G_p$ to the new group G.

18. A non-transitory computer-readable storage device comprising instructions that, when executed by a processor, cause the processor to perform operations, for tracking from a vehicle, an object by generating kinematic models corresponding to the object, object, comprising:
receiving scan data associated with the object;
generating, using the scan data, a new frame F, associated with a new time t+dt and including new points X;
identifying a new group G of new points $X_i$, of the new points X of the new frame F, where i=1, . . . , N, with N being a positive integer corresponding to a number of the new points;
associating the new group G with the object based on previous information associated with the object; and
determining, based on the new group G, a new kinematic model M corresponding to the object;
wherein:
determining, based on the new group G, the new kinematic model M corresponding to the object includes generating a predicted group $G_p$;
generating the predicted group $G_p$ is performed as a function of a previous kinematic model representing the object, the new group G, and a translation vector T;
the predicted group $G_p$ corresponds to a future time t+δt, and is determined according to:

$$G_{t+\delta t}{}^P = G_t + T_t|_{\delta t};$$

$G^P$ represents the predicted group $G_p$;
$G^P{}_{t+\delta t}$ represents the predicted group in association with the future time t+δt;
$T_t|_{\delta t}$ represents the translation vector T;
the translation vector $T_t|_{\delta t}$ includes an x-direction translation component dx and a y-direction translation component dy;
the translation components are determined as a function of a velocity $V_t$ and a velocity direction θt of the previous kinematic model representing the object;
the translation components dx, dy are related to the velocity $V_t$ and the velocity direction θt of the previous kinematic model representing the object according to:

$$T_t|_{\delta t} = \begin{bmatrix} dx \\ dy \end{bmatrix} I_N = \begin{bmatrix} V_t\cos(\theta_t)dt \\ V_t\sin(\theta_t)dt \end{bmatrix} I_N;$$

and
$I_N$ is an identity matrix.

19. The computer-readable storage device of claim 18, wherein:

the operations further comprise processing the new frame F prior to identifying the new group G of new points $X_i$ of the new frame F; and processing the new frame F includes the filtering the new frame F to represent the new frame F by vehicle-reference coordinates.

20. The computer-readable storage device of claim 18, wherein:

the operations further comprise processing the new frame F prior to identifying the new group G of new points $X_i$ of the new frame F; and processing the new frame F includes the filtering the new frame F to represent the new frame F by ground-reference coordinates.

\* \* \* \* \*